(12) United States Patent
Gao et al.

(10) Patent No.: US 12,317,199 B2
(45) Date of Patent: May 27, 2025

(54) INFORMATION TRANSMISSION METHOD AND DEVICE, INFORMATION RECEPTION METHOD AND DEVICE, COMMUNICATION NODE, AND STORAGE MEDIUM

(71) Applicant: ZTE Corporation, Guangdong (CN)

(72) Inventors: Bo Gao, Shenzhen (CN); Zhaohua Lu, Shenzhen (CN); Yu Ngok Li, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 601 days.

(21) Appl. No.: 17/668,942

(22) Filed: Feb. 10, 2022

(65) Prior Publication Data
US 2022/0322248 A1    Oct. 6, 2022

Related U.S. Application Data

(63) Continuation of application No. PCT/CN2020/108808, filed on Aug. 13, 2020.

(30) Foreign Application Priority Data

Aug. 13, 2019 (CN) .......................... 201910746227.3

(51) Int. Cl.
*H04W 52/36* (2009.01)
*H04B 7/06* (2006.01)
(Continued)

(52) U.S. Cl.
CPC ....... *H04W 52/367* (2013.01); *H04W 52/146* (2013.01); *H04W 52/325* (2013.01); *H04W 52/365* (2013.01)

(58) Field of Classification Search
CPC ............. H04W 52/367; H04W 52/146; H04W 52/325; H04W 52/365; H04W 52/242;
(Continued)

(56) References Cited

U.S. PATENT DOCUMENTS 9,461,805 B2   10/2016 Kim et al.
2012/0178494 A1*  7/2012 Haim .................. H04W 52/365
                                                    455/522
(Continued)

FOREIGN PATENT DOCUMENTS

CN         103503525 A     1/2014
CN         107734626 A     2/2018
(Continued)

OTHER PUBLICATIONS

Examination Report for corresponding Indian application No. 202217006886 dated Apr. 2, 2024, 6p, in English and Indian languages.
(Continued)

*Primary Examiner* — Joseph E Dean, Jr.
(74) *Attorney, Agent, or Firm* — Crowell & Moring LLP

(57) ABSTRACT

Provided are an information sending method and apparatus, an information reception method and apparatus, a communication node and a storage medium. The information sending method is applied to a first communication node and includes the following. Report information is sent to a second communication node. The report information includes at least one of: first type power parameter information or uplink channel state information.

14 Claims, 5 Drawing Sheets

(51) Int. Cl.
*H04W 52/14* (2009.01)
*H04W 52/32* (2009.01)

(58) Field of Classification Search
CPC .... H04W 52/42; H04W 52/54; H04B 7/0404; H04B 7/063; H04B 7/0639; H04B 7/0691; H04B 7/0695; H04B 7/0426; H04B 7/0617
See application file for complete search history.

(56) References Cited

U.S. PATENT DOCUMENTS

| | | | |
|---|---|---|---|
| 2012/0281568 A1* | 11/2012 | Ho | H04W 52/365 370/252 |
| 2014/0219234 A1 | 8/2014 | Kim et al. | |
| 2015/0282093 A1 | 10/2015 | Kaukovuori et al. | |
| 2015/0358920 A1 | 12/2015 | Sorrentino et al. | |
| 2018/0115957 A1 | 4/2018 | Lin et al. | |
| 2019/0364519 A1 | 11/2019 | Fu et al. | |
| 2020/0351798 A1 | 11/2020 | Ji et al. | |
| 2021/0175919 A1* | 6/2021 | Badic | H04B 7/0408 |

FOREIGN PATENT DOCUMENTS

| | | |
|---|---|---|
| CN | 107979869 A | 5/2018 |
| CN | 108347762 A | 7/2018 |
| CN | 109803363 A | 5/2019 |
| CN | 110536397 A | 12/2019 |
| EP | 4 187 980 A1 | 5/2023 |
| JP | 2012-169873 A | 9/2012 |
| JP | 2013-541925 A | 11/2013 |
| JP | 2014-502128 A | 1/2014 |
| JP | 2014-517595 A | 7/2014 |
| WO | WO 2019/099634 A1 | 5/2019 |
| WO | WO 2021/027863 A1 | 2/2021 |

OTHER PUBLICATIONS

European Examination Report for corresponding European Patent Application No. 20 852 542.8 dated Sep. 16, 2024 (7 pages).
Office Action for corresponding Japanese Application No. 2022-508826, dated Jun. 25, 2024, with English translation (13 pages).
ZTE, Enhancement on FR2 MPE mitigation [online], 3GPP TSG RAN WG1 Meeting #102-e R1-2005443, Internet URL:https://www.3gpp.org/ftp/TSG_RAN/WG1_RL1/TSGR1_102-e/Docs/R1-2005443.zip, Aug. 8, 2020 (2 pages).
International Search Report for priority application No. PCT/CN2020/108808 dated Nov. 11, 2020, 4p, in Chinese and English languages.
Written Opinion of the International Searching Authority for priority application No. PCT/CN2020/108808 dated Nov. 6, 2020, 4p, in Chinese language.
Concise Explanation of Relevancy.
Second Office Action for corresponding Chinese application No. 202211202285.8 dated Oct. 27, 2023, 4p, in Chinse language.
English language translation for the Second Office Action for corresponding Chinese application No. 202211202285.8 dated Oct. 27, 2023, 2p.
First Office Action for corresponding Chinese application No. 202211202285.8 dated Jun. 29, 2023, 6p, in Chinese language.
English language translation of the First Office Action for corresponding Chinese application No. 202211202285.8 dated Jun. 29, 2023, 3p.
Extended European Search Report for corresponding application No. EP 208525428 dated Jul. 21, 2023, 10p.
ZTE, "Enhancement on FR2 MPE mitigation", 3GPP TSG RAN WG1, Meeting #102, R1-2005443, May 25, 2020, 2p.
Office Action for corresponding Taiwanese application No. 109127576 dated Dec. 6, 2023, 10p.
English language summary of Office Action for corresponding Taiwanese application No. 109127576 dated Dec. 6, 2023, 2p.

* cited by examiner

Send report information to a second communication node, where the report information includes at least one of: first type power parameter information or uplink channel state information ⟶ S110

INFORMATION TRANSMISSION METHOD AND DEVICE, INFORMATION RECEPTION METHOD AND DEVICE, COMMUNICATION NODE, AND STORAGE MEDIUM

This application is a continuation application of International Patent Application No. PCT/CN2020/108808, filed Aug. 13, 2020 and entitled "INFORMATION TRANSMISSION METHOD AND DEVICE, INFORMATION RECEPTION METHOD AND DEVICE, COMMUNICATION NODE, AND STORAGE MEDIUM," which claims priority to Chinese Patent Application No. 201910746227.3 filed with the China National Intellectual Property Administration (CNIPA) on Aug. 13, 2019, the disclosures of both of which are incorporated herein by reference in their entireties.

TECHNICAL FIELD

The present application relates to the field of communication, for example, to an information sending method and apparatus, an information reception method and apparatus, a communication node and a storage medium.

BACKGROUND

Ultra-wideband high-frequency bands (that is, millimeter wave communication) become an important direction for mobile communication development and attract the attention of the global academia and industry. For example, the advantages of millimeter waves become increasingly attractive with increasingly congested spectrum resources and a huge number of accesses to physical networks at present. Standardization has been started in many standards organizations such as the Institute of Electrical and Electronics Engineers (IEEE) and the 3rd Generation Partnership Project (3GPP). For example, in 3GPP standard organizations, high-frequency band communication becomes an important innovation point of the New Radio Access Technology (New RAT) of the fifth generation (5G) mobile communication technology by virtue of its significant advantage of wide bandwidths.

In a training process of antenna weights (also referred to as precoding or beams), a high-frequency band sending terminal sends a training pilot, and a reception terminal receives channels and performs channel estimation. Then the high-frequency band reception terminal needs to feed back channel state information to a training sending terminal, so that a transceiver may find, from optional transceiver antenna weight pairs, multiple groups of transceiver antenna weight pairs which can be used for multi-path data transmission to improve overall spectrum efficiency.

In the 5G communication system, considering maximum power exposure (MPE) to the human body, the required maximum sending power backoff will be different from the perspective of actual transmission due to different irradiation to the human body under different uplink beams. From the perspective of transmission, the maximum power reduction (MPR) brought by the MPE needs to be as low as possible to achieve efficient transmission for the uplink. However, in practical systems, the maximum power reduction under different beams cannot be effectively realized from the perspective of scheduling by a base station.

SUMMARY

The present application provides an information sending method and apparatus, an information reception method and apparatus, a communication node and a storage medium. Report information is effectively sent to a second communication node, so that the second communication node determines maximum power reduction.

Embodiments of the present application provide an information sending method. The information sending method is applied to a first communication node and includes the following.

Report information is sent to a second communication node, where the report information includes at least one of: first type power parameter information or uplink channel state information.

The embodiments of the present application provide an information reception method. The information reception method is applied to a second communication node and includes the following.

Report information sent by a first communication node is received, where the report information includes at least one of: first type power parameter information or uplink channel state information.

The first communication node is scheduled.

The embodiments of the present application provide an information sending apparatus. The apparatus includes a sending module.

The sending module is configured to send report information to a second communication node, where the report information includes at least one of: first type power parameter information or uplink channel state information.

The embodiments of the present application provide an information reception apparatus. The apparatus includes a reception module and a scheduling module.

The reception module is configured to receive report information sent by a first communication node, where the report information includes at least one of: first type power parameter information or uplink channel state information.

The scheduling module is configured to schedule the first communication node.

The embodiments of the present application provide a first communication node. The first communication node includes one or more processors and a storage apparatus configured to store one or more programs.

When executed by the one or more processors, the one or more programs cause the one or more processors to implement the information sending method provided by the embodiments of the present application.

The embodiments of the present application provide a second communication node. The second communication node includes one or more processors and a storage apparatus configured to store one or more programs.

When executed by the one or more processors, the one or more programs cause the one or more processors to implement the information reception method provided by the embodiments of the present application.

The embodiments of the present application provide a storage medium configured to store a computer program which, when executed by a processor, implements any method of the embodiments of the present application.

DETAILED DESCRIPTION

Embodiments of the present application are described hereinafter in detail in conjunction with the drawings. It is to be noted that if not in collision, the embodiments of the present application and features therein may be combined with each other in any manner.

Figures 1, 2:
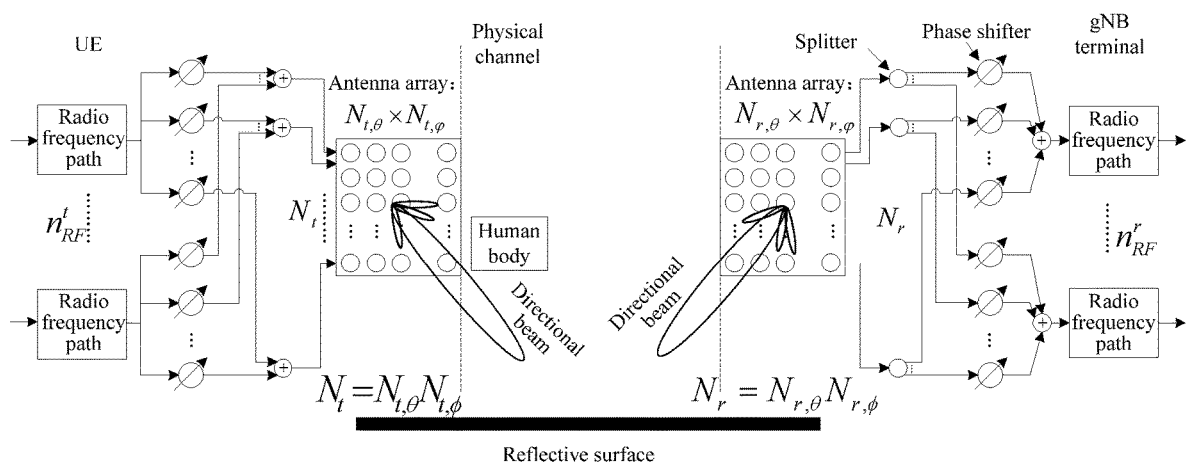
FIG. 1 is a flowchart of an information sending method according to the present application.
FIG. 2 is a structural diagram of a hybrid precoding transceiver according to the present application.

In an exemplary embodiment, FIG. 1 is a flowchart of an information sending method according to the present application. The method may be applied to the case where a second communication node (such as a base station) determines the maximum power reduction of a first communication node. This method may be executed by an information sending apparatus provided by the present application, and the information sending apparatus may be implemented by software and/or hardware and integrated on the first communication node.

The information sending method provided by the present application may be considered as a method for feeding back power parameters and channel state information. From the perspective of scheduling by the base station, it is impossible to effectively realize the maximum power reduction under different beams, and the maximum power reduction can only be detected by the first communication node, such as a user equipment (UE). The user equipment passively reduces the sending power of the user equipment, resulting in a great degradation in the performance of uplink transmission. The present application provides feedback of power parameters and channel quality for maximum power exposure (MPE), and thereby the base station terminal, that is, the second communication node is assisted in performing effective scheduling to avoid the impact on the human body.

In the present application, through power parameters and channel state information fed back according to channel quality measurement and other measurement information (for example, detection of a human body direction by a camera) of the user equipment (UE), the impact of the MPE such as first type power parameter information and an index of an uplink beam in consideration of the MPE, such as uplink channel state information, are directly or indirectly fed back to the base station terminal, that is, through the first type power parameter information or the uplink channel state information, the maximum power reduction is directly or indirectly fed back, the decision of the base station terminal on the subsequent uplink beam scheduling for an uplink channel and a reference signal is effectively assisted, and the system performance is significantly improved.

The reference signal includes at least one of: a channel state information reference signal (CSI-RS), a channel state information interference measurement (CSI-IM) signal, a demodulation reference signal (DMRS), a downlink demodulation reference signal (DL DMRS), an uplink demodulation reference signal (UL DMRS), a channel sounding reference signal (SRS), a phase-tracking reference signal (PT-RS), an uplink phase-tracking reference signal (UL PT-RS), a downlink phase-tracking reference signal (DL PT-RS), a random-access channel (RACH) signal, a synchronization signal (SS), a synchronization signal block (SS block, also referred to as SS/PBCH block), a primary synchronization signal (PSS) or a secondary synchronization signal (SSS).

A beam may be a resource (for example, a reference signal resource, a spatial relation, a sending terminal spatial filter, a reception terminal spatial filter, sending terminal precoding, reception terminal precoding, an antenna port, an antenna weight vector (AWV) and an antenna weight matrix). A beam serial number may be replaced with a resource index (for example, a reference signal resource index), since for transmission, the beam may be bound to some time-frequency code resources. The beam may also be a transmission (sending/reception) manner. The transmission manner may include space-division multiplexing, frequency-domain/time-domain diversity or the like.

Furthermore, the base station terminal, that is, the second communication node, may perform quasi co-location (QCL) configuration for two reference signals and notify the UE such as the first communication node to describe the channel characteristic hypothesis. Parameters related to the quasi co-location include at least one of: Doppler spread, Doppler shift, delay spread, average delay, average gain and spatial parameters. The spatial parameters may include spatial receive parameters, such as an angle of arrival, a spatial correlation of a received beam, average delay and a correlation (including phase information) between time-frequency channel responses.

The MPE issue is described as below. Maximum allowed power refers to the upper limit value of sending power for a certain time of transmission, and is also referred to as real maximum sending power and recorded as PCMAX. The maximum allowed power is generally determined according to UE capabilities, base station deployment, frequency band information and other factors.

When determining maximum sending power PCMAX, c, the UE firstly needs to determine an upper limit and a lower limit, and values between the upper limit and the lower limit are legal as below:

$$P_{CMAX\_L,c} \leq P_{CMAX,c} \leq P_{CMAX\_H,c}.$$

The upper limit and the lower limit are defined as follows:

$$P_{CMAX\_L,c} = \mathrm{MIN}\{P_{EMAX,c} - \Box T_{C,c}, (P_{PowerClass} - \Delta P_{PowerClass}) - \mathrm{MAX}(MPR_c + A\text{-}MPR_c + \Delta T_{IB,c} + \Box T_{C,c} + \Box T_{ProSe}, P\text{-}MPR_c)\};$$

and $$P_{CMAX\_H,c} = \mathrm{MIN}\{P_{EMAX,c}, P_{PowerClass} - \Delta P_{PowerClass}\}.$$

The subscript c denotes that the parameter is used for distinguishing between cells, and c denotes cell c. PEMAX,c denotes maximum sending power configured by the network side and is related to the network deployment strategy. TC,c is set for the upper sideband and the lower sideband and has a value of 1.5 dB or 0 dB. PPowerClass denotes the maximum sending power without consideration of a power deviation tolerance (hereinafter the tolerance for short).

Different power classes correspond to different values. ΔPPowerClass is a decrease in PPowerClass when the configuration of the uplink-and-downlink ratio of a user equipment of a second type power class, that is, a Power class 2 UE, is 0 or 6, that is, when the uplink occupies more time. The value of ΔPPowerClass is 3 dB, and the value for other uplink-and-downlink ratios is 0 dB. ΔTIB,c denotes an additional tolerance set for some cells c, with a value of 0 dB or between 0 dB to 0.9 dB according to the configuration. TProSe is set in consideration of a direct communication scene between users, and the value of TProSe is 0.1 dB or 0 dB.

Maximum power reduction (MPR) parameters are set to consider the higher order modulation and coding scheme (MCS) and transmission bandwidth factors. The higher the modulation order is, the more the maximum sending power is limited, and the relatively smaller the maximum sending power is allowed. The more resource blocks (RBs) are actually allocated, the more the maximum sending power is limited, and the smaller the maximum sending power is allowed.

Additional MPR (A-MPR) parameters are set in consideration of the requirements for additional specific deployment scenes. That is, the requirements for radio frequency sending are different in different deployment scenes or different countries and regions. For most scenes, the value of A-MPR is between 1 dB to 5 dB, and for some scenes, the value reaches 17 dB.

P-MPRc, that is, power management maximum power reduction, denotes the maximum sending power reduction which is set in consideration of factors such as electromagnetic energy absorption or interference reduction among multiple systems.

In the present application, the MPR may be any one of the MPR, the A-MPR, or the P-MPR with consideration of higher order MCS and transmission bandwidth factors.

FIG. 2 is a structural diagram of a hybrid precoding transceiver according to the present application; The hybrid precoding is hybrid analog—digital beamforming. A sending terminal and a reception terminal of a system are configured with multiple antenna units and multiple radio frequency links. Each radio frequency link is connected to an antenna array unit (a partial connection scene is not excluded), and each antenna unit has a digital keying phase shifter. A high-frequency band system implements beamforming of an analog terminal by loading different amounts of phase shifts on signals of the antenna units. Specifically, in a hybrid beamforming transceiver, multiple radio frequency signal streams exist. Each signal stream is loaded with a precoding antenna weight vector (AWV) via the digital keying phase shifter and sent from the multiple antenna units to a high-frequency band physical propagation channel. At the reception terminal, radio frequency signal streams received by the multiple antenna units are weighted and combined into a single signal stream, and after radio frequency demodulation is performed at the reception terminal, a receiver finally obtains multiple received signal streams which are sampled and received by a digital baseband.

The MPR should be a beam-specific or antenna group-specific (panel-specific)MPR.

A typical beam report is a beam report for downlink transmission, that is, a downlink reference signal index is reported according to Reference Signal Receiving Power (RSRP). However, for uplink transmission, the impact of additional power management maximum power reduction (P-MPR) needs to be considered if the uplink transmission beam corresponding to the reported downlink reference signal points to the human body. Therefore, the optimal downlink transmission beam combination is not necessarily an uplink transmission beam combination. In addition, the impact of the P-MPR works only when the sending power of the UE reaches Pc,max and an uplink duty cycle exceeds a threshold. When the P-MPR does not take effect, the optimal downlink beam may be assumed to be the optimal uplink beam.

Figure 3:
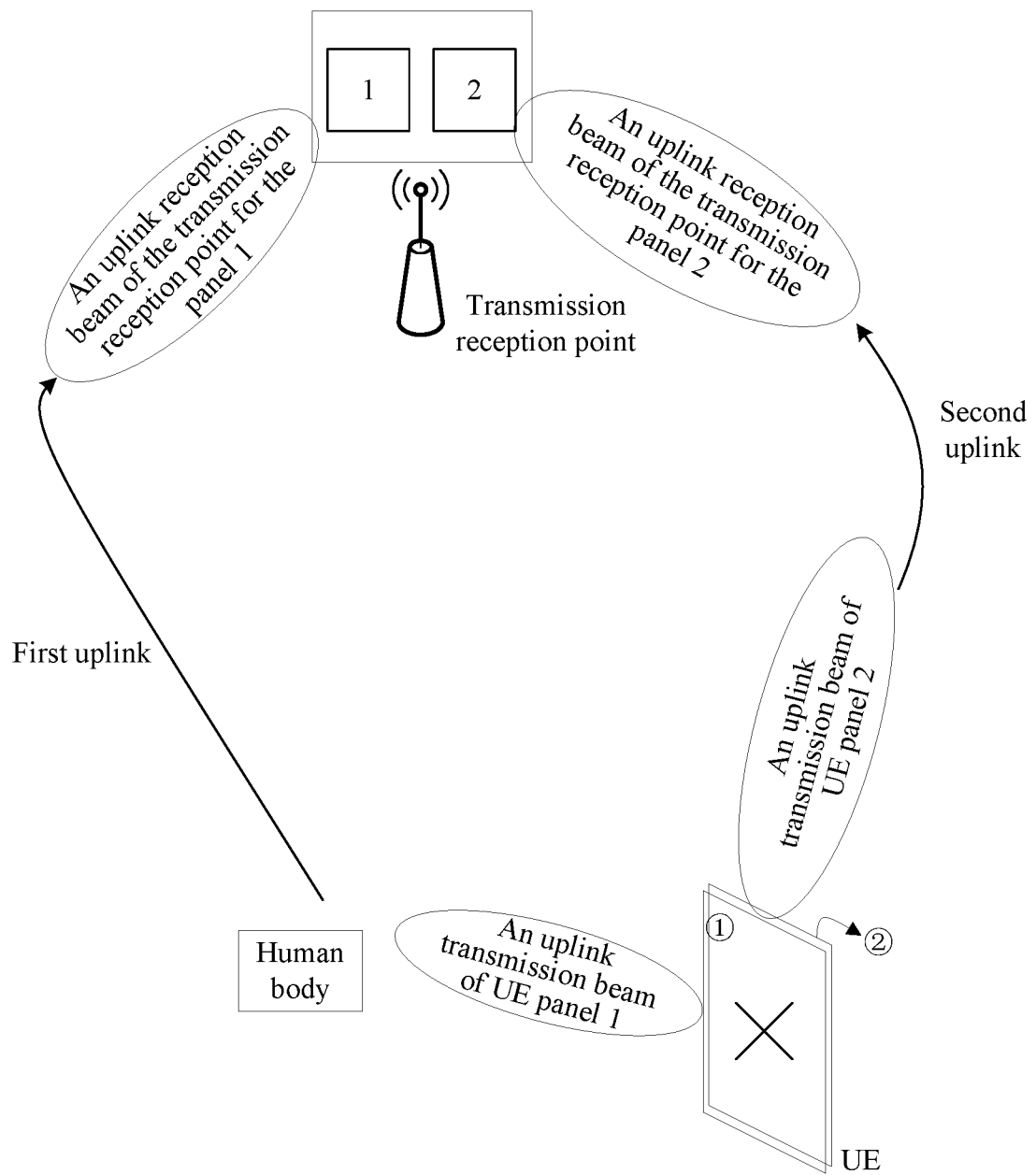
FIG. 3 is a schematic diagram illustrating the impact of panel-specific MPE according to the present application.

FIG. 3 is a schematic diagram illustrating the impact of panel-specific MPE according to the present application. When the UE has multiple antenna groups, each antenna group corresponds to different MPR. For example, the UE includes two antenna panels for uplink transmission, that is, 2 panels for UL transmission. The boresight of the panel 1, that is, panel-1, faces the human body, so that the MPR is very large; however, the boresight of the panel 2, that is, panel-2, of the UE does not face the human body, so that the impact from the MPR can be ignored under the UE panel-2. The uplink transmission beam of the panel 1 of the UE is UL Tx beam @UE panel-1. The uplink transmission beam of the panel 2 of the UE is UL Tx beam @UE panel-2. The first uplink is UL-Link-1. The second uplink is UL-Link-2. The uplink reception beam of a transmission reception point (TRP) for the panel 1 is UL Rx beam @TRP sub-panel 1. The uplink reception beam of the transmission reception point (TRP) for the panel 2 is UL Rx beam @TRP sub-panel 2.

As shown in FIG. 1, an information sending method provided by the present application includes S110.

In S110, report information is sent to a second communication node, where the report information includes at least one of: first type power parameter information or uplink channel state information.

The information sending method in the present application may be referred to as a parameter feedback method. That is, the first type power parameter information is sent to the second communication node, or the uplink channel state information is sent to the second communication node, or the first type power parameter information and the uplink channel state information are sent to the second communication node. At least one of the first type power parameter information or the uplink channel state information is sent to the second communication node. In this way, maximum power reduction is directly or indirectly fed back to the second communication node, so that the second communication node schedules the first communication node to reduce the impact of the first communication node on the human body. The report information may be information reported to the second communication node. The report information may include at least one of: the first type power parameter information or the uplink channel state information.

It should be noted that the difference between the "first type" and the "second type" (the same for power parameter information, antenna group information and reference signal information, and not limited herein) in the present application is that the first type information needs to be carried in a report, that is, contained in the report information, and is reported by a UE, that is, the first communication node, to a base station terminal, that is, the second communication node. After the base station terminal receives the report, the scheduling and decision-making activities of the base station terminal are affected. An association relationship between second type information may be configured by the base station to the UE, or predetermined, rather than being reported to the base station terminal in first type information.

In addition, the first type information and the second type information may be the same or different. For example, the first type power parameter information may be power headroom, while the second type power parameter information may be maximum power reduction. For the convenience of expression herein, the parameter of a first type identification is referred to as the first type information, and the parameter of a second type identification is referred to as the second type information. For example, the first type information includes, but is not limited to, first type power parameter information, first type antenna group information and first type reference signal information.

According to an information sending method provided by the present application, report information is sent to a second communication node. The report information includes at least one of: first type power parameter information or uplink channel state information. In this way, the report information is effectively sent to the second communication node, so that the second communication node determines maximum power reduction, and thus schedules a first communication node to reduce maximum power exposure to the human body.

On the basis of the above embodiment, variant embodiments of the above embodiment are proposed, and it should be noted that herein, for the brevity of description, only differences from the above embodiment will be described in the variant embodiments.

In an embodiment, the first type power parameter information includes at least one of: maximum power reduction, a remaining energy value, an accumulated energy value, an uplink duty cycle information, alert identification information, power backoff or power headroom.

The remaining energy value refers to a maximum exposed energy value minus an accumulated energy value during a window or a first time unit. The accumulated energy value is energy accumulated during a given window or a given time unit. A parameter of the given window is configurable, and for example, configured by the second communication node. The parameter of the window includes at least one of: a window length, a window period, a start point of the window or a time offset of the window. The time unit is determined by a time unit in which the report information is located or a time unit of a physical uplink shared channel (PUSCH) with which the report information is associated.

The power headroom may be real power headroom or virtual power headroom. In an embodiment, the virtual power headroom may also be referred to as power headroom based on a reference format.

The uplink duty cycle information, also referred to as uplink duty cycle value or uplink duty cycle, represents a ratio of accumulated uplink transmission time duration within a given time range and the time duration of the given time range.

The alert identification information is the information representing whether a power-related parameter or a parameter variation (such as the maximum power reduction, the remaining energy value, the accumulated energy value, the uplink duty cycle information, the power headroom or the power backoff) triggers a threshold, information for enabling feedback of power parameter (such as P-MPR), or MPE alert information.

In an embodiment, the uplink channel state information includes at least one of: first type reference signal information, first type antenna group information, an uplink path loss value, quasi co-location information, quasi co-location beam information or an uplink additional corrected value.

The uplink additional corrected value refers to a corrected value for an uplink transmission parameter, or a value corrected with respect to a downlink transmission parameter. The corrected parameter will be used for uplink transmission.

In an embodiment, reference signal information may be an uplink reference signal index or a downlink reference signal index. The reference signal information includes, but is not limited to, first type reference signal information and second type reference signal information.

In an embodiment, an uplink reference signal includes at least one of: a DMRS, a UL DMRS, a UL PT-RS, an SRS or a physical random access channel (PRACH).

In an embodiment, a downlink reference signal includes at least one of: a DMRS, a DL DMRS, a DL PT-RS, a CSI-RS or an SS block.

In an embodiment, in a case where the uplink channel state information includes first type antenna group information, the first type antenna group information is at least one of: a beam group, an antenna port group, an antenna panel, a panel or a reference signal resource group.

An antenna group may be at least one of: a beam group, an antenna port group, an antenna panel, a panel, a UE panel or a reference signal resource group.

In an embodiment, the beam group is defined as that beams within one group can be sent or received simultaneously, and/or beams within different groups cannot be sent or received simultaneously.

In an embodiment, the antenna group is defined as that beams within one group cannot be sent or received simultaneously, and/or beams within different groups can be sent or received simultaneously.

In an embodiment, the antenna group is defined as that more than N beams within one group can be sent or received simultaneously, and/or no more than N beams within one group can be sent or received simultaneously, where N is an integer greater than or equal to 1.

In an embodiment, in a case where the uplink channel state information includes first type antenna group information, the first type antenna group information is uplink antenna group information.

In an embodiment, before the report information is sent to the second communication node, the method may further include at least one of the following. Second type power parameter information is associated with second type antenna group information; second type power parameter information is associated with second type reference signal information; second type power parameter information is associated with a transmission parameter; second type power parameter information is determined by second type antenna group information; second type power parameter information is determined by second type reference signal information; or second type power parameter information is determined by a transmission parameter. The second type power parameter information includes at least one of: maximum power reduction, a remaining energy value, an accumulated energy value, an uplink duty cycle information, alert identification information, power backoff or power headroom. The second type antenna group information includes at least one of: a beam group, an antenna port group, an antenna panel, a panel or a reference signal resource group. The transmission parameter includes at least one of: a transmission occasion, a beam or a spatial relation.

In an embodiment, in a case where the first type power parameter information includes a remaining energy value, the remaining energy value is a maximum exposed energy value minus an accumulated energy value during a window or a first time unit.

In an embodiment, in a case where the first type power parameter information includes an accumulated energy value, the accumulated energy value is energy accumulated during a window or a first time unit.

In an embodiment, a parameter of the window is configured by the second communication node.

In an embodiment, the first time unit is determined by a time unit in which the report information is located or a time unit of a physical uplink shared channel with which the report information is associated.

In an embodiment, in a case where the first type power parameter information includes alert identification information, the alert identification information is determined by a first threshold and at least one of following parameters: maximum power reduction, a remaining energy value, an accumulated energy value, an uplink duty cycle information, power backoff or power headroom.

In an embodiment, in a case where the first type power parameter information includes first type reference signal information, the first type reference signal information is a reference signal resource index or a reference signal resource group index.

In an embodiment, in a case where the first type power parameter information includes power headroom, the first type power parameter information further includes at least one of: an uplink power control parameter set, a spatial relation, second type antenna group information, an uplink reference signal or a downlink reference signal.

In an embodiment, an uplink power control parameter in the uplink power control parameter set includes at least one of: a path loss value, a reference signal associated with a path loss, target power, a path loss proportionality coefficient, a closed loop index, a beam index or an antenna group index.

In an embodiment, an uplink power control parameter includes at least one of: a path loss value, a reference signal associated with a path loss, target power, a path loss proportionality coefficient, a closed loop index, a beam index or an antenna group index. In an embodiment, the target power is also referred to as P0. In an embodiment, the path loss proportionality coefficient is also referred to as alpha. In an embodiment, MPR is determined by at least one of following parameters associated with the MPR: a beam or an antenna group.

In an embodiment, an uplink power control parameter associated with the power headroom is determined by at least one of following parameters: the spatial relation, the second type antenna group information, the uplink reference signal or the downlink reference signal.

In an embodiment, in a case where the first type power parameter information includes power headroom, the power headroom includes virtual power headroom, and sending of the virtual power headroom is triggered by signaling, where the signaling is associated with at least one of following parameters: an uplink power control parameter set, third type reference signal information or third type antenna group information.

The third type reference signal information and the third type antenna group information are information associated with signaling for triggering the sending of virtual power headroom. The "third type" is only used for distinguishing.

In an embodiment, an uplink power control parameter associated with the virtual power headroom is determined by the third type reference signal information or the third type antenna group information.

In an embodiment, sending the report information to the second communication node includes the following. In a case where a first type parameter is greater than or equal to a second threshold, the report information is sent to the second communication node, where the report information includes power headroom, and the first type parameter includes at least one of: maximum power reduction, power backoff or an uplink duty cycle information. That is, in a case where the first type parameter is greater than the second threshold, the power headroom is sent to the second communication node.

In an embodiment, an uplink power control parameter associated with the power headroom is determined by a reference signal associated with the first type parameter, a spatial relation associated with the first type parameter or antenna group information associated with the first type parameter.

In an embodiment, an uplink power control parameter associated with the power headroom is determined by an uplink power control parameter set associated with an uplink shared channel, an uplink power control parameter set associated with an uplink control channel or an uplink power control parameter set associated with an uplink reference signal.

In an embodiment, antenna group information associated with the power headroom is determined by antenna group information associated with an uplink shared channel, antenna group information associated with an uplink control channel or antenna group information associated with an uplink reference signal.

In an embodiment, in a case where the first type power parameter information includes power headroom, the power headroom is power headroom for an uplink shared channel, power headroom for an uplink control channel or power headroom for an uplink reference signal.

In an embodiment, the first type power parameter information is determined by a second time unit, or the first type power parameter information is determined by a second time unit minus or plus a time offset, where the second time unit includes at least one of: a time unit in which the report information is located, a time unit of an uplink shared channel associated with the report information, a time unit of signaling for triggering the report information or a time unit associated with an event for triggering the report information.

In an embodiment, in a case where the first type power parameter information is determined by the second time unit minus or plus the time offset, the time offset is determined by a parameter set such as Numerology or capability information of the first communication node.

In an embodiment, the report information is a periodic report, a semi-persistent report or an aperiodic report.

In an embodiment, sending the report information to the second communication node includes the following. In a case where a second type parameter is greater than or equal to a third threshold, or a variation between a current second type parameter and a second type parameter for sending of report information last time is greater than or equal to a fourth threshold, the report information is sent to the second communication node, where the second type parameter includes at least one of: maximum power reduction, a remaining energy value, an accumulated energy value, an uplink duty cycle information, alert identification information, power backoff or power headroom.

In an embodiment, sending the report information to the second communication node includes the following. In a case where a third type parameter is less than or equal to a fifth threshold, or a variation between a current third type parameter and a third type parameter for sending of report information last time is less than or equal to a sixth threshold, the report information is sent to the second communication node, where the third type parameter includes at least one of: maximum power reduction, a remaining energy value, an accumulated energy value, an uplink duty cycle information, alert identification information, power backoff or power headroom.

It should be noted that the "first", the "second", the "third", the "fourth", the "fifth" and the "sixth" in the "first threshold", the "second threshold", the "third threshold", the "fourth threshold", the "fifth threshold" and the "sixth threshold" are only for distinguishing between the thresholds, and the specific values of the thresholds are not limited.

In an embodiment, sending the report information to the second communication node includes the following.

In a case where a timer associated with third type power parameter information overflows, the report information is sent to the second communication node, where the third type power parameter information includes at least one of: maximum power reduction, a remaining energy value, an accumulated energy value, an uplink duty cycle information, alert identification information, power backoff or power headroom.

The third type power parameter information is to limit the sending condition of the report information, which does not mean that the condition (such as the first type power parameter information) needs to be reported to the base station terminal, or the base station is required to configure an association relationship (such as the second type power parameter information).

Therefore, the first type power parameter information, the second type power parameter information and the third type power parameter information may be the same or different. For example, the first type power parameter information may be power headroom, the second type power parameter information may be maximum power reduction, and the third type power parameter information may be power backoff.

In an embodiment, the method further includes the following. Report configuration information of the second communication node is received, where the report configuration information includes at least one of: enabling information of maximum power reduction or indication information of an uplink report.

The report configuration information may be configuration information for configuring a report type or report information of the first communication node.

For example, to acquire uplink beam information with low MPR, when the P-MPR takes effect, the UE is allowed to feed back a beam index under a given beam set and a corresponding virtual power headroom report (PHR). It should be noted that the beam set may include an uplink beam or a downlink beam. When the beam set includes the downlink beam, the UE may derive a corresponding uplink sending beam by means of beam correspondence.

In an embodiment, the method further includes the following. In a case where the report configuration information includes the enabling information of the maximum power reduction, the report information is determined according to the enabling information of the maximum power reduction; or in a case where the report configuration information includes the indication information of the uplink report, a report type of the first communication node is determined according to the indication information of the uplink report. The report type includes, but is not limited to, the uplink report.

The information sending method is exemplarily described below. A power parameter and channel state information (a reference signal index) are determined according to P-MPR and fed back to the base station terminal.

In example 1, a parameter feedback method is applied to a first communication node and includes the following.

A first type report, that is, report information, is sent to a second communication node. The first type report includes at least one of: power parameter information, that is, first type power parameter information, or uplink channel state information.

The power parameter information includes at least one of: maximum power reduction (MPR), a remaining energy value, an accumulated energy value, an uplink duty cycle information, alert identification information, power backoff or power headroom.

The uplink channel state information includes at least one of: reference signal information, that is, first type reference signal information, antenna group information, that is, first antenna group information, an uplink path loss value, quasi co-location information, quasi co-location beam information or an uplink additional corrected value.

In example 2, according to the method of example 1, at least one of the following is included. The power parameter information is associated with the antenna group information; the power parameter information is associated with the reference signal information; the power parameter information is determined by the antenna group information; or the power parameter information is determined by the reference signal information.

In example 2a, according to the method of example 1, the antenna group may be referred to as at least one of: a beam group, an antenna port group, an antenna panel or a panel.

In example 2aa, according to the method of example 1, the antenna group is an uplink antenna group.

In example 2b, according to the method of example 1, at least one of characteristics below is further included. The MPR is associated with the antenna group information; the MPR is associated with the reference signal information; the MPR is determined by the antenna group; or the MPR is determined by the reference signal information.

In example 2b, according to the method of example 1, the remaining energy value refers to a maximum exposed energy value minus an accumulated energy value during a window or a first time unit.

In example 2c, according to the method of example 1 and example 2b, the accumulated energy value is energy accumulated during a given window or a given time unit.

In example 2ca, according to the method of example 2b and example 2c, a parameter of the given window is configurable.

In example 2cb, according to the method of example 2b and example 2c, the given time unit is determined by a time unit in which the first type report is located or a time unit of a PUSCH with which the first type report is associated.

In example 2d, according to the method of example 1, the value of the alert identification is determined by at least one of following parameters and a first threshold: maximum power reduction, a remaining energy value, an accumulated energy value, an uplink duty cycle information, power backoff or power headroom.

In example 2e, according to the method of example 1, the reference signal information may be a reference signal resource index or a reference signal resource group index.

In example 3, according to the method of example 1, in a case where the first type power parameter information includes power headroom, the first type power parameter information further includes at least one of: an uplink power control parameter set, a spatial relation, an antenna group, an uplink reference signal or a downlink reference signal.

In example 3a, according to the method of example 1, the power headroom further includes virtual power headroom. The virtual power headroom is triggered by first type signaling. The first type signaling is associated with the uplink power control parameter set. An A-type reference signal includes one of: third type reference signal information or an A-type antenna group, that is, third type antenna group information.

In example 3b, according to the method of example 3a, an uplink power control parameter associated with the virtual power headroom is determined by A-type reference signal information or A-type antenna group information.

In example 3c, according to the method of example 1, in a case where a first type parameter is greater than or equal to a threshold, the power headroom is sent. The first type parameter includes MPR, power backoff or an uplink duty cycle information.

In example 3ca, according to the method of example 3c, an uplink power control parameter associated with the power headroom is determined by a reference signal associated with a transmission parameter, a spatial relation associated with the transmission parameter or an antenna group associated with the transmission parameter.

In example 3cb, according to the method of example 3c, an uplink power control parameter associated with the power headroom is determined by an uplink power control parameter set associated with an uplink shared channel, an uplink power control parameter set associated with an uplink control channel or an uplink power control parameter set associated with an uplink reference signal.

In example 3cc, according to the method of example 3c, an antenna group associated with the power headroom is determined by an antenna group associated with an uplink shared channel, an antenna group associated with an uplink control channel or an antenna group associated with an uplink reference signal.

In example 3d, according to the method of example 1, the power headroom is power headroom for an uplink shared channel, power headroom for an uplink control channel or power headroom for an uplink reference signal.

In example 4, according to the method of example 1, a transmission parameter associated with the calculation of the power parameter information is determined by a first type time unit, or a transmission parameter associated with the calculation of the power parameter information is determined by a first type time unit minus or plus a time offset.

The first type time unit includes at least one of: a time unit in which the first type report is located, a time unit of an uplink shared channel associated with the first type report, a time unit of signaling for triggering the first type report or a time unit associated with an event for triggering the first type report.

In example 4a, according to the method of example 4, the time offset is determined by Numerology or capability information of the first communication node.

In example 5, according to the method of example 1, the first type report is a periodic report, a semi-persistent report or an aperiodic report.

In example 5a, according to the method of example 1, in a case where a second type parameter is greater than or equal to a threshold, or a variation between a current second type parameter and a second type parameter for the sending of a first type report last time is greater than or equal to a threshold, the first type report is sent.

The second type parameter includes at least one of: maximum power reduction, a remaining energy value, an accumulated energy value, an uplink duty cycle information, alert identification, power backoff or power headroom.

In example 5b, according to the method of example 1, in a case where a third type parameter is less than or equal to a threshold, the first type report is sent.

The third type parameter includes at least one of: maximum power reduction, a remaining energy value, an accumulated energy value, an uplink duty cycle information, alert identification, power backoff or power headroom.

In example 5c, according to the method of example 1, in a case where a timer associated with the power parameter information overflows, the first type report is sent.

In example 5d, according to example 1, the method further includes: Before the first type report is sent, report configuration information of the second communication node is received. The report configuration information includes an enabling MPR parameter. The first type report is determined according to the MPR parameter, or a report type is an uplink report.

In example 6, according to the methods of example 3, example 3a, example 3b, example 3ca and example 3cb, the uplink power control parameter includes at least one of: a path loss value, a reference signal associated with a path loss, target power, a path loss proportionality coefficient, a closed loop index, a beam index or an antenna group index.

Table 1 is the format of the uplink report involved in the present application. Report information including first type power parameter information and uplink channel state information is taken as an example. In an uplink report, that is, when the report information is sent, power parameter information, that is, the first type power parameter information, and the uplink channel state information are included. An association relationship exists between the power parameter information and the uplink channel state information. For example, the power parameter information is reference information, for example, the value of MPR, corresponding to an uplink reference signal or a downlink reference signal. In an embodiment, the value of MPR under a given uplink beam or a given downlink beam is reported.

TABLE 1

Format of the uplink report involved in the present application

Power parameter information
Uplink channel state information

A power headroom report (PHR) is equal to the difference between $P_{cmax}$ and required power. For a real PHR, the required power is determined according to actual transmission in consideration of the impact of an uplink beam. For a virtual PHR, the required power is determined based on a preconfigured parameter. To actively report the impact of the MPR or MPE, PHR reporting under an optional uplink beam set needs to be supported, where the PHR reporting needs to carry relevant information about an uplink beam.

Table 2 is a power headroom parameter report format involved in the present application.

TABLE 2

Power headroom parameter report format
involved in the present application
Reference signal index or spatial relation index

| P | V | Power headroom |
| R | R | $P_{CMAX, c}$ |

Referring to Table 2, Table 2 is a power headroom parameter report format involved in the present application. P indicates whether backoff power is used (that is, due to P-MPR). When P=1, it is indicated that the backoff power is used, and a $P_{CMAX,c}$ field is output. V indicates whether a virtual PHR or a real PHR is currently output. R represents a reserved field. A reference signal index or a spatial relation index indicates that when V=1 and a virtual PHR is output, the PHR calculates assumed uplink beam information.

In an embodiment, when a real PHR is reported and the value of MPR is greater than or equal to a threshold, the UE may still report a virtual PHR. In this way, a potential low-MPE-impact uplink beam may be provided for assisting the base station in scheduling.

Figure 3A:
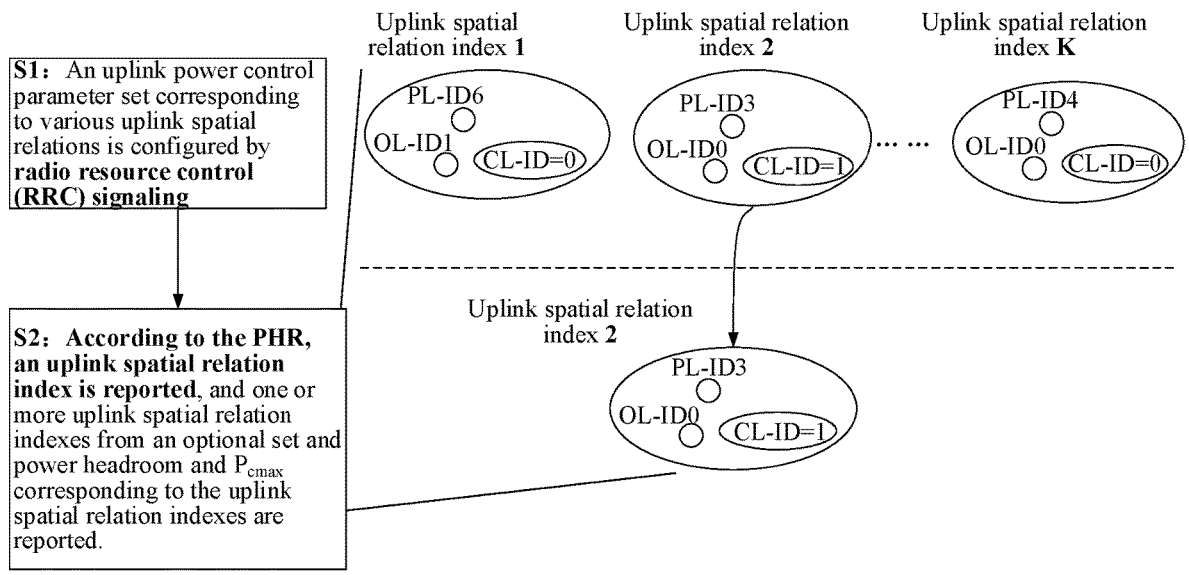
FIG. 3A is a configuration flowchart for virtual power headroom according to the present application.

FIG. 3A is a configuration flowchart for virtual power headroom according to the present application. Referring to FIG. 3A, S1 and S2 are included.

S1 refers to an uplink power control parameter set corresponding to various uplink spatial relations is configured by radio resource control (RRC) signaling.

S2 refers to that according to the PHR, an uplink spatial relation index is reported, and one or more uplink spatial relation indexes from an optional set and power headroom and Pcmax corresponding to the uplink spatial relation indexes are reported.

The base station terminal configures multiple uplink spatial relations through RRC signaling, where each uplink spatial relation is associated with an uplink power control parameter set. When the virtual PHR reporting is started, the UE terminal may select an uplink spatial relation from the multiple uplink spatial relations, such as uplink spatial relation index 2, and thus calculate the value of the virtual PHR and the value of Pcmax. For example, with the target of maximizing the PHR value, the uplink spatial relation index with the maximum PHR value and the power control parameter thereof are reported.

Figure 3B:
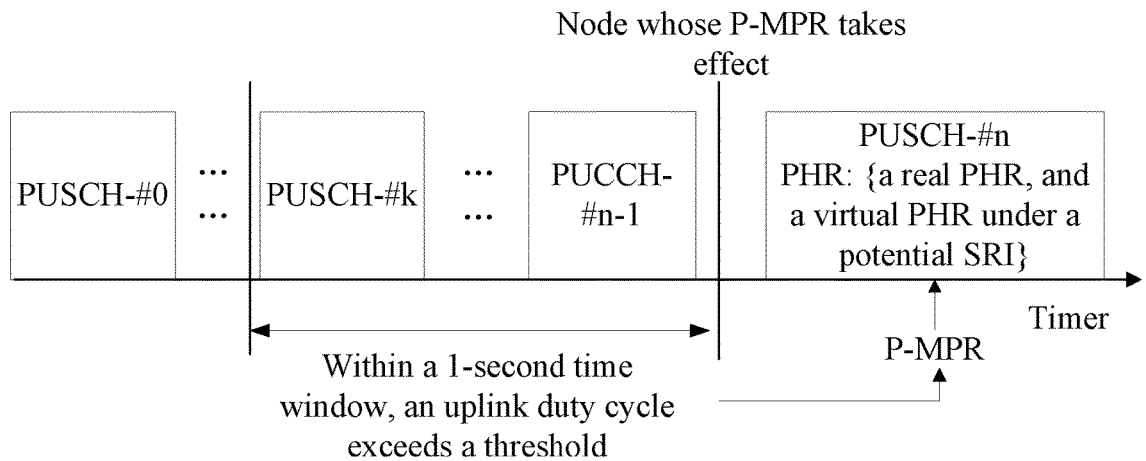
FIG. 3B is a schematic diagram of a condition and method for triggering a power headroom report according to the present application.

FIG. 3B is a schematic diagram of a condition and method for triggering a power headroom report according to the present application. Within a given time window (for example, within 1 second), after an uplink duty cycle information exceeds a threshold, the P-MPR starts to take effect and a PHR report is triggered. The PHR report is carried on PUSCH-#n. The PHR report carries a real PHR, and additionally, a virtual PHR report under one or more potential SRS resource indications (SRIs) is provided. In an embodiment, the potential SRI is the SRI indicated for PUSCH transmission on a downlink control information (DCI) field.

To detect a low-MPE-impact uplink beam, in addition to reporting of the PHR value, the virtual PHR report format may include: a reference signal (that is, reference signal information) or an uplink power control parameter set. In an embodiment, the reference signal and the uplink power control parameter set may be selected from an alternative set preconfigured by the base station.

When the impact of the MPE exceeds a threshold (for example, P-MPR and an uplink duty cycle information), the virtual PHR is triggered to report. Users should report the PHR value and the reference signal or the uplink power control parameter set associated with the PHR value with the goal of maximizing the PHR value (or minimizing the P-MPR and the path loss value). In an embodiment, when the reference signal is reported, the path loss value associated with the PHR value needs to be determined according to the reference signal.

The virtual PHR includes a virtual PHR for a PUSCH, a virtual PHR for a physical uplink control channel (PUCCH) or a virtual PHR for an SRS.

In an exemplary embodiment, the present application further provides an information reception method. The information reception method is applied to a second communication node. This method may be executed by an information reception apparatus, and the information reception apparatus may be implemented by software and/or hardware and integrated on the second communication node. The method may be adapted to the case of determining the maximum power reduction of a first communication node. For the content that is not yet exhaustive in this embodiment, reference may be made to the above embodiments, which is not repeated herein.

Figure 4:
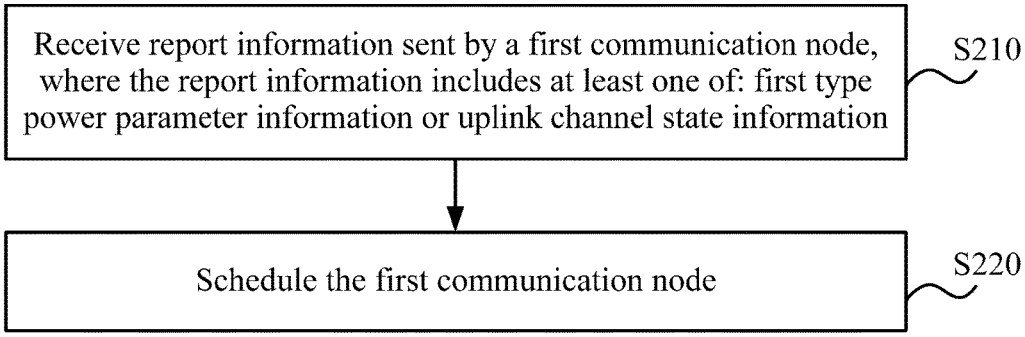
FIG. 4 is a flowchart of an information reception method according to the present application.

FIG. 4 is a flowchart of an information reception method according to the present application. As shown in FIG. 4, the information reception method provided by the present application includes S210 and S220.

In S210, report information sent by a first communication node is received, where the report information includes at least one of: first type power parameter information or uplink channel state information.

In S220, the first communication node is scheduled.

When the first communication node is scheduled, the scheduling on the first communication node may be performed according to the report information, so as to reduce the impact of the first communication node on the human body. For example, the beam with the lowest maximum power reduction is selected for communication.

According to an information reception method provided by the present application, report information sent by a first communication node is received, where the report information includes first type power parameter information or uplink channel state information; and the first communication node is scheduled. A second communication node determines maximum power reduction of the first communication node based on the report information, and then schedules the first communication node based on the report information so as to reduce the maximum power exposure to the human body.

On the basis of the above embodiment, variant embodiments of the above embodiments are proposed, and it should be noted that herein, for the brevity of description, only differences from the above embodiments will be described in the variant embodiments.

In an embodiment, the first type power parameter information includes at least one of: maximum power reduction, a remaining energy value, an accumulated energy value, an uplink duty cycle information, alert identification information, power backoff or power headroom.

In an embodiment, the uplink channel state information includes at least one of: first type reference signal information, first type antenna group information, an uplink path loss value, quasi co-location information, quasi co-location beam information or an uplink additional corrected value.

In an embodiment, in a case where the uplink channel state information includes first type antenna group information, the first type antenna group information is at least one of: a beam group, an antenna port group, an antenna panel, a panel or a reference signal resource group.

In an embodiment, in a case where the uplink channel state information includes first type antenna group information, the first type antenna group information is uplink antenna group information.

In an embodiment, at least one of the following is further included. Second type power parameter information is associated with second type antenna group information; second type power parameter information is associated with second type reference signal information; second type power parameter information is associated with a transmission parameter; second type power parameter information is determined by second type antenna group information; second type power parameter information is determined by second type reference signal information; or second type power parameter information is determined by a transmission parameter. The second type power parameter information includes at least one of: maximum power reduction, a remaining energy value, an accumulated energy value, an uplink duty cycle information, alert identification information, power backoff or power headroom. The second type antenna group information includes at least one of: a beam group, an antenna port group, an antenna panel, a panel or a reference signal resource group. The transmission parameter includes at least one of: a transmission occasion, a beam or a spatial relation.

In an embodiment, in a case where the first type power parameter information includes a remaining energy value, the remaining energy value is a maximum exposed energy value minus an accumulated energy value during a window or a first time unit.

In an embodiment, in a case where the first type power parameter information includes an accumulated energy value, the accumulated energy value is energy accumulated during a window or a first time unit.

In an embodiment, the first time unit is determined by a time unit in which the report information is located or a time unit of a physical uplink shared channel with which the report information is associated.

In an embodiment, the method further includes the following. A window of the first communication node is configured. For example, a parameter of the first communication node, that is, a parameter of the window, is configured. The parameter of the window includes at least one of: a window length, a window period, a start point of the window or a time offset of the window.

In an embodiment, in a case where the first type power parameter information includes alert identification information, the alert identification information is determined by a first threshold and at least one of following parameters: maximum power reduction, a remaining energy value, an accumulated energy value, an uplink duty cycle information, power backoff or power headroom.

In an embodiment, in a case where the first type power parameter information includes first type reference signal information, the first type reference signal information is a reference signal resource index or a reference signal resource group index.

In an embodiment, in a case where the first type power parameter information includes power headroom, the first type power parameter information further includes at least one of: an uplink power control parameter set, a spatial relation, second type antenna group information, an uplink reference signal or a downlink reference signal.

In an embodiment, an uplink power control parameter in the uplink power control parameter set includes at least one of: a path loss value, a reference signal associated with a path loss, target power, a path loss proportionality coefficient, a closed loop index, a beam index or an antenna group index.

In an embodiment, an uplink power control parameter associated with the power headroom is determined by at least one of following parameters: the spatial relation, the second type antenna group information, the uplink reference signal or the downlink reference signal.

In an embodiment, in a case where the first type power parameter information includes power headroom, the power headroom includes virtual power headroom, and sending of the virtual power headroom is triggered by signaling, where the signaling is associated with at least one of following parameters: an uplink power control parameter set, third type reference signal information or third type antenna group.

In an embodiment, an uplink power control parameter associated with the virtual power headroom is determined by the third type reference signal information or third type antenna group information.

In an embodiment, in a case where the first type power parameter information includes power headroom, the power headroom is power headroom for an uplink shared channel, power headroom for an uplink control channel or power headroom for an uplink reference signal.

In an embodiment, the first type power parameter information is determined by a second time unit, or the first type power parameter information is determined by a second time unit minus or plus a time offset, where the second time unit includes at least one of: a time unit in which the report information is located, a time unit of an uplink shared channel associated with the report information, a time unit of signaling for triggering the report information or a time unit associated with an event for triggering the report information. After the location of the time unit is determined, the second communication node can accurately understand the meaning of the report and infer the impact or the trend of the impact on later transmission.

In an embodiment, in a case where the first type power parameter information is determined by the second time unit minus or plus the time offset, the time offset is determined by a parameter set or capability information of the first communication node.

In an embodiment, the report information is a periodic report, a semi-persistent report or an aperiodic report.

In an embodiment, the method further includes the following. Report configuration information is sent, where the report configuration information includes at least one of: enabling information of maximum power reduction or indication information of an uplink report.

Figure 5:
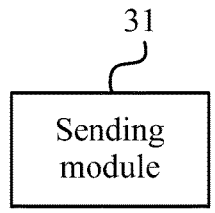
FIG. 5 is a structural diagram of an information sending apparatus according to an embodiment of the present application.

The present application provides an information sending apparatus. FIG. 5 is a structural diagram of an information sending apparatus according to an embodiment of the present application. As shown in FIG. 5, the information sending apparatus provided by the embodiment of the present application may be integrated on a first communication node. The apparatus includes a sending module 31, which is configured to send report information to a second communication node, where the report information includes at least one of: first type power parameter information or uplink channel state information.

The information sending apparatus provided by the embodiment is configured to implement the information sending method of the embodiments of the present application. The information sending apparatus provided by the embodiment has similar implementation principles and technical effects to the information sending method of the embodiments of the present application, which will not be repeated here.

In an embodiment, the first type power parameter information involved in the sending module 31 includes at least one of: maximum power reduction, a remaining energy value, an accumulated energy value, an uplink duty cycle information, alert identification information, power backoff or power headroom.

In an embodiment, the uplink channel state information involved in the sending module 31 includes at least one of: first type reference signal information, first type antenna group information, an uplink path loss value, quasi co-location information, quasi co-location beam information or an uplink additional corrected value.

In an embodiment, in a case where the uplink channel state information involved in the sending module 31 includes first type antenna group information, the first type antenna group information is at least one of: a beam group, an antenna port group, an antenna panel, a panel or a reference signal resource group.

In an embodiment, in a case where the uplink channel state information involved in the sending module 31 includes first type antenna group information, the first type antenna group information is uplink antenna group information.

In an embodiment, the apparatus further includes an association module. The association module is configure to execute at least one of the following: associating second type power parameter information with second type antenna group information, associating second type power parameter information with a transmission parameter, associating second type power parameter information with second type reference signal information, determining second type power parameter information by second type antenna group information, determining second type power parameter information by second type reference signal information, or determining second type power parameter information by a transmission parameter. The second type power parameter information includes at least one of: maximum power reduction, a remaining energy value, an accumulated energy value, an uplink duty cycle information, alert identification information, power backoff or power headroom. The second type antenna group information includes at least one of: a beam group, an antenna port group, an antenna panel, a panel or a reference signal resource group. The transmission parameter includes at least one of: a transmission occasion, a beam or a spatial relation.

In an embodiment, in a case where the first type power parameter information involved in the sending module 31 includes a remaining energy value, the remaining energy value is a maximum exposed energy value minus an accumulated energy value during a window or a first time unit.

In an embodiment, in a case where the first type power parameter information involved in the sending module 31 includes an accumulated energy value, the accumulated energy value is energy accumulated during a window or a first time unit.

In an embodiment, a parameter of the window involved in the sending module 31 is configured by the second communication node.

In an embodiment, the first time unit involved in the sending module 31 is determined by a time unit in which the report information is located or a time unit of a physical uplink shared channel with which the report information is associated.

In an embodiment, in a case where the first type power parameter information involved in the sending module 31 includes alert identification information, the alert identification information is determined by a first threshold and at least one of following parameters: maximum power reduction, a remaining energy value, an accumulated energy value, an uplink duty cycle information, power backoff or power headroom.

In an embodiment, in a case where the first type power parameter information involved in the sending module 31 includes first type reference signal information, the first type reference signal information is a reference signal resource index or a reference signal resource group index.

In an embodiment, in a case where the first type power parameter information involved in the sending module 31 includes power headroom, the first type power parameter information further includes at least one of: an uplink power control parameter set, a spatial relation, second type antenna group information, an uplink reference signal or a downlink reference signal.

In an embodiment, an uplink power control parameter in the uplink power control parameter set involved in the sending module 31 includes at least one of: a path loss value, a reference signal associated with a path loss, target power, a path loss proportionality coefficient, a closed loop index, a beam index or an antenna group index.

In an embodiment, an uplink power control parameter associated with the power headroom involved in the sending module 31 is determined by at least one of following parameters: the spatial relation, the second type antenna group information, the uplink reference signal or the downlink reference signal.

In an embodiment, in a case where the first type power parameter information involved in the sending module 31 includes power headroom, the power headroom includes virtual power headroom, and sending of the virtual power headroom is triggered by signaling, where the signaling is associated with at least one of following parameters: an uplink power control parameter set, third type reference signal information or third type antenna group information.

In an embodiment, an uplink power control parameter associated with the virtual power headroom involved in the sending module 31 is determined by the third type reference signal information or the third type antenna group information.

In an embodiment, the sending module 31 is configured that in a case where a first type parameter is greater than or equal to a second threshold, the report information is sent to the second communication node, where the report information includes power headroom, and the first type parameter includes at least one of: maximum power reduction, power backoff or an uplink duty cycle information.

In an embodiment, an uplink power control parameter associated with the power headroom involved in the sending module 31 is determined by a reference signal associated with the first type parameter, a spatial relation associated with the first type parameter or antenna group information associated with the first type parameter.

In an embodiment, an uplink power control parameter associated with the power headroom involved in the sending module 31 is determined by an uplink power control parameter set associated with an uplink shared channel, an uplink power control parameter set associated with an uplink control channel or an uplink power control parameter set associated with an uplink reference signal.

In an embodiment, antenna group information associated with the power headroom involved in the sending module 31 is determined by antenna group information associated with an uplink shared channel, antenna group information associated with an uplink control channel or antenna group information associated with an uplink reference signal.

In an embodiment, in a case where the first type power parameter information involved in the sending module 31 includes power headroom, the power headroom is power headroom for an uplink shared channel, power headroom for an uplink control channel or power headroom for an uplink reference signal.

In an embodiment, the first type power parameter information involved in the sending module 31 is determined by a second time unit, or the first type power parameter information is determined by a second time unit minus or plus a time offset, where the second time unit includes at least one of: a time unit in which the report information is located, a time unit of an uplink shared channel associated with the report information, a time unit of signaling for triggering the report information or a time unit associated with an event for triggering the report information.

In an embodiment, in a case where the first type power parameter information involved in the sending module 31 is determined by the second time unit minus or plus the time offset, the time offset is determined by a parameter set or capability information of the first communication node.

In an embodiment, the report information involved in the sending module 31 is a periodic report, a semi-persistent report or an aperiodic report.

In an embodiment, the sending module 31 is configured that in a case where a second type parameter is greater than or equal to a third threshold, or a variation between a current second type parameter and a second type parameter for sending of report information last time is greater than or equal to a fourth threshold, the report information is sent to the second communication node, where the second type parameter includes at least one of: maximum power reduction, a remaining energy value, an accumulated energy value, an uplink duty cycle information, alert identification information, power backoff or power headroom.

In an embodiment, the sending module 31 is configured that in a case where a third type parameter is less than or equal to a fifth threshold, or a variation between a current third type parameter and a third type parameter for sending of report information last time is less than or equal to a sixth threshold, the report information is sent to the second communication node, where the third type parameter includes at least one of: maximum power reduction, a remaining energy value, an accumulated energy value, an uplink duty cycle information, alert identification information, power backoff or power headroom.

In an embodiment, the sending module is configured that in a case where a timer associated with third type power parameter information overflows, the report information is sent to the second communication node, where the third type power parameter information includes at least one of: maximum power reduction, a remaining energy value, an accumulated energy value, an uplink duty cycle information, alert identification information, power backoff or power headroom.

In an embodiment, the apparatus further includes a reception module. The reception module is configured to receive report configuration information of the second communication node, where the report configuration information includes at least one of: enabling information of maximum power reduction or indication information of an uplink report.

In an embodiment, the apparatus further includes a determination module. The determination module is configured that in a case where the report configuration information includes the enabling information of the maximum power reduction, the report information is determined according to the enabling information of the maximum power reduction; or in a case where the report configuration information includes the indication information of the uplink report, a report type of the first communication node is determined according to the indication information of the uplink report.

Figure 6:
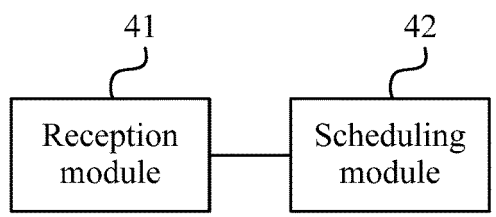
FIG. 6 is a structural diagram of an information reception apparatus according to an embodiment of the present application.

The present application further provides an information reception apparatus. FIG. 6 is a structural diagram of an information reception apparatus according to an embodiment of the present application. As shown in FIG. 6, the information reception apparatus in the embodiments of the present application may be integrated on a second communication node. The apparatus includes a reception module 41 and a scheduling module 42. The reception module 41 is configured to receive report information sent by a first communication node, where the report information includes at least one of: first type power parameter information or uplink channel state information. The scheduling module 42 is configured to schedule the first communication node.

The information reception apparatus provided by the embodiment is configured to implement the information reception method of the embodiments of the present application. The information reception apparatus provided by the embodiment has similar implementation principles and technical effects to the information reception method of the embodiments of the present application, which will not be repeated here.

In an embodiment, the first type power parameter information involved in the reception module 41 includes at least one of: maximum power reduction, a remaining energy value, an accumulated energy value, an uplink duty cycle information, alert identification information, power backoff or power headroom.

In an embodiment, the uplink channel state information involved in the reception module 41 includes at least one of: first type reference signal information, first type antenna group information, an uplink path loss value, quasi co-location information, quasi co-location beam information or an uplink additional corrected value.

In an embodiment, in a case where the uplink channel state information involved in the reception module 41 includes first type antenna group information, the first type antenna group information is at least one of: a beam group, an antenna port group, an antenna panel, a panel or a reference signal resource group.

In an embodiment, in a case where the uplink channel state information involved in the reception module 41 includes first type antenna group information, the first type antenna group information is uplink antenna group information.

In an embodiment, the apparatus further includes a determination module. The determination module is configure to execute at least one of the following: associating second type power parameter information with second type antenna group information, associating second type power parameter information with second type reference signal information, associating second type power parameter information with a transmission parameter, determining second type power parameter information by second type antenna group information, determining second type power parameter information by second type reference signal information, or determining second type power parameter information by a transmission parameter. The second type power parameter information includes at least one of: maximum power reduction, a remaining energy value, an accumulated energy value, an uplink duty cycle information, alert identification information, power backoff or power headroom. The second type antenna group information includes at least one of: a beam group, an antenna port group, an antenna panel, a panel or a reference signal resource group. The transmission parameter includes at least one of: a transmission occasion, a beam or a spatial relation.

In an embodiment, in a case where the first type power parameter information involved in the reception module 41 includes a remaining energy value, the remaining energy value is a maximum exposed energy value minus an accumulated energy value during a window or a first time unit.

In an embodiment, in a case where the first type power parameter information involved in the reception module 41 includes an accumulated energy value, the accumulated energy value is energy accumulated during a window or a first time unit.

In an embodiment, the first time unit involved in the reception module 41 is determined by a time unit in which the report information is located or a time unit of a physical uplink shared channel with which the report information is associated.

In an embodiment, a configuration module is further included and is configured to configure a window of the first communication node.

In an embodiment, in a case where the first type power parameter information involved in the reception module 41 includes alert identification information, the alert identification information is determined by a first threshold and at least one of following parameters: maximum power reduction, a remaining energy value, an accumulated energy value, an uplink duty cycle information, power backoff or power headroom.

In an embodiment, in a case where the first type power parameter information involved in the reception module 41 includes first type reference signal information, the first type reference signal information is a reference signal resource index or a reference signal resource group index.

In an embodiment, in a case where the first type power parameter information involved in the reception module 41 includes power headroom, the first type power parameter information further includes at least one of: an uplink power control parameter set, a spatial relation, second type antenna group information, an uplink reference signal or a downlink reference signal.

In an embodiment, an uplink power control parameter in the uplink power control parameter set involved in the reception module 41 includes at least one of: a path loss value, a reference signal associated with a path loss, target power, a path loss proportionality coefficient, a closed loop index, a beam index or an antenna group index.

In an embodiment, an uplink power control parameter associated with the power headroom involved in the reception module 41 is determined by at least one of following parameters: the spatial relation, the second type antenna group information, the uplink reference signal or the downlink reference signal.

In an embodiment, in a case where the first type power parameter information involved in the reception module 41 includes power headroom, the power headroom includes virtual power headroom, and sending of the virtual power headroom is triggered by signaling, where the signaling is associated with at least one of following parameters: an uplink power control parameter set, third type reference signal information or third type antenna group.

In an embodiment, an uplink power control parameter associated with the virtual power headroom involved in the reception module 41 is determined by the third type reference signal information or third type antenna group information.

In an embodiment, in a case where the first type power parameter information involved in the reception module 41 includes power headroom, the power headroom is power headroom for an uplink shared channel, power headroom for an uplink control channel or power headroom for an uplink reference signal.

In an embodiment, the first type power parameter information involved in the reception module 41 is determined by a second time unit, or the first type power parameter information is determined by a second time unit minus or plus a time offset, where the second time unit includes at least one of: a time unit in which the report information is located, a time unit of an uplink shared channel associated with the report information, a time unit of signaling for triggering the report information or a time unit associated with an event for triggering the report information.

In an embodiment, in a case where the first type power parameter information involved in the reception module 41 is determined by the second time unit minus or plus the time offset, the time offset is determined by a parameter set or capability information of the first communication node.

In an embodiment, the report information involved in the reception module 41 is a periodic report, a semi-persistent report or an aperiodic report.

In an embodiment, the apparatus further includes a sending module. The sending module is configured to send report configuration information, where the report configuration information includes at least one of: enabling information of maximum power reduction or indication information of an uplink report.

Figure 7:
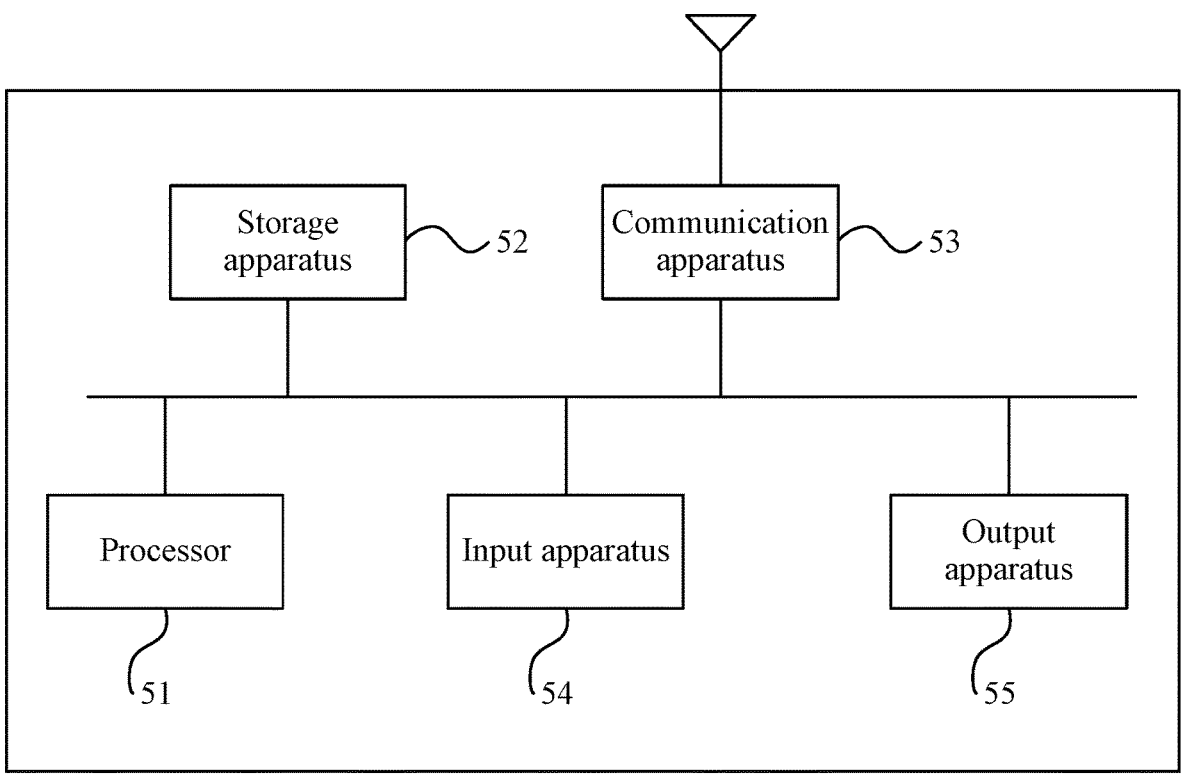
FIG. 7 is a structural diagram of a first communication node according to an embodiment of the present application.

An embodiment of the present application further provides a first communication node. FIG. 7 is a structural diagram of a first communication node according to an embodiment of the present application. As shown in FIG. 7, the first communication node provided by the present application may be a user equipment. The first communication node includes one or more processors 51 and a storage apparatus 52. One or more processors 51 may be provided in the first communication node. In FIG. 7, one processor 51 is used as an example. The storage apparatus 52 is configured to store one or more programs. The one or more programs, when executed by the one or more processors 51, cause the one or more processors 51 to implement the information sending method of the embodiments of the present application.

The first communication node further includes a communication apparatus 53, an input apparatus 54 and an output apparatus 55.

The processor 51, the storage apparatus 52, the communication apparatus 53, the input apparatus 54 and the output apparatus 55 in the first communication node may be connected via a bus or other means, with connection via a bus as an example in FIG. 7.

The input apparatus 54 may be configured to receive input digital or character information and to generate key signal input related to user settings and function control of the first communication node. The output apparatus 55 may include a display screen and other display devices.

The communication apparatus 53 may include a receiver and a transmitter. The communication apparatus 53 is configured to perform information transceiving and communication under the control of the processor 51.

As a computer-readable storage medium, the storage apparatus 52 may be configured to store software programs, computer-executable programs and modules, such as program instructions/modules (for example, the sending module 31 in the information sending apparatus) corresponding to the information sending method of the embodiments of the present application. The storage apparatus 52 may include a program storage region and a data storage region. The program storage region may store an operating system and an application program required by at least one function. The data storage region may store data created depending on use of a device. Additionally, the storage apparatus 52 may include a high-speed random-access memory and may further include a nonvolatile memory such as at least one click memory, a flash memory or another nonvolatile solid-state memory. In some examples, the storage apparatus 52 may include memories which are remotely disposed with respect to the processor 51. These remote memories may be connected to the first communication node via a network. Examples of the above network include, but are not limited to, the Internet, an intranet, a local area network, a mobile communication network and a combination thereof.

Figure 8:
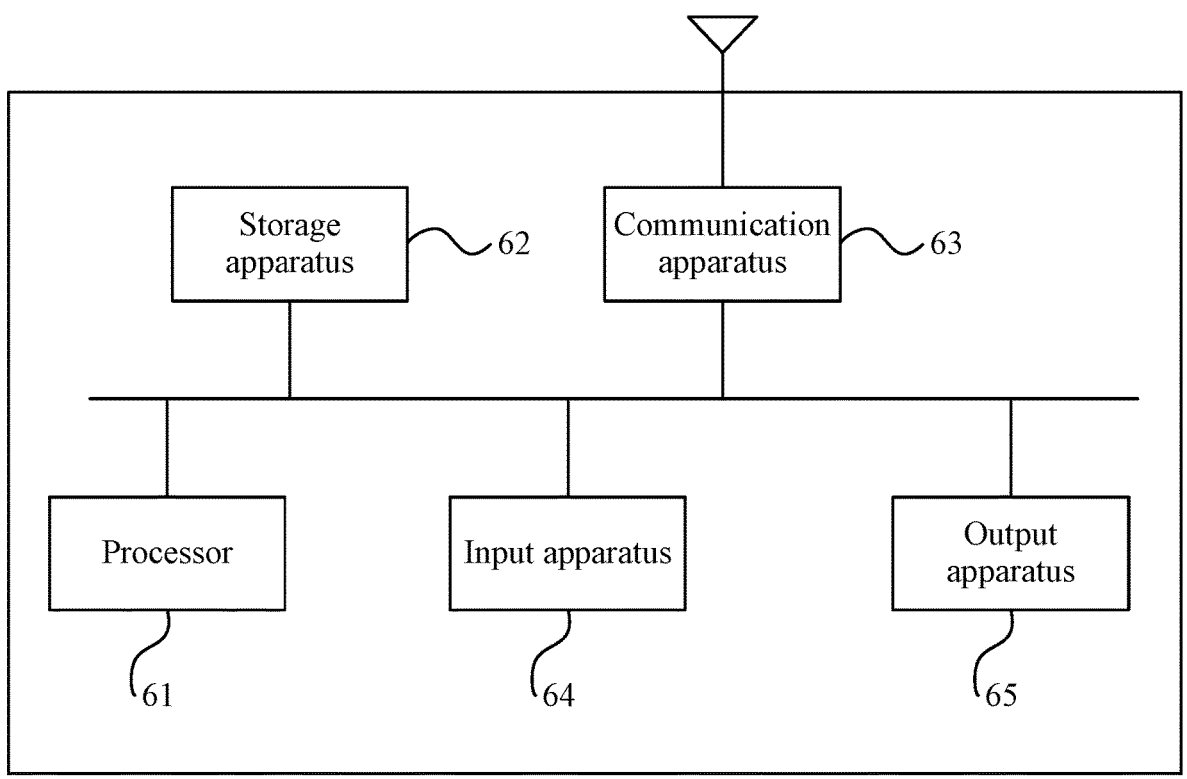
FIG. 8 is a structural diagram of a second communication node according to an embodiment of the present application.

An embodiment of the present application further provides a second communication node. FIG. 8 is a structural diagram of a second communication node according to an embodiment of the present application. As shown in FIG. 8, the second communication node provided by the present application may be a base station. The second communication node includes one or more processors 61 and a storage apparatus 62. One or more processors 61 may be provided in the second communication node. In FIG. 6, one processor 61 is used as an example. The storage apparatus 62 is configured to store one or more programs. The one or more programs, when executed by the one or more processors 61, cause the one or more processors 61 to implement the information reception method of the embodiments of the present application.

The second communication node further includes a communication apparatus 63, an input apparatus 64 and an output apparatus 65.

The processor 61, the storage apparatus 62, the communication apparatus 63, the input apparatus 64 and the output apparatus 65 in the second communication node may be connected via a bus or other means, with connection via a bus as an example in FIG. 6.

The input apparatus 64 may be configured to receive input digital or character information and to generate key signal input related to user settings and function control of the first communication node. The output apparatus 65 may include a display screen and other display devices.

The communication apparatus 63 may include a receiver and a transmitter. The communication apparatus 63 is configured to perform information transceiving and communication under the control of the processor 61.

As a computer-readable storage medium, the storage apparatus 62 may be configured to store software programs, computer-executable programs and modules, such as program instructions/modules (for example, the reception module 41 and the scheduling module 42 in the information reception apparatus) corresponding to the information reception method of the embodiments of the present application. The storage apparatus 62 may include a program storage region and a data storage region. The program storage region may store an operating system and an application program required by at least one function. The data storage region may store data created depending on use of a device. Additionally, the storage apparatus 62 may include a high-speed random-access memory and may further include a nonvolatile memory such as at least one click memory, a flash memory or another nonvolatile solid-state memory. In some examples, the storage apparatus 62 may include memories which are remotely disposed with respect to the processor 61. These remote memories may be connected to the second communication node via a network. Examples of the preceding network include, but are not limited to, the Internet, an intranet, a local area network, a mobile communication network and a combination thereof.

An embodiment of the present application further provides a storage medium. The storage medium is configured to store a computer program which, when executed by a processor, implements the information sending method of any one of the embodiments of the present application or the information reception method of any one of the embodiments of the present application. The information sending method includes the following. Report information is sent to a second communication node, where the report information includes first type power parameter information or uplink channel state information.

The information reception method includes the following. Report information sent by a first communication node is received, where the report information includes first type power parameter information or uplink channel state information. The first communication node is scheduled.

The above are only exemplary embodiments of the present application and are not intended to limit the scope of the present application.

It is to be understood by those skilled in the art that the term "terminal", for example, the first communication node, covers any suitable type of radio UE, for example, a mobile phone, a portable data processing apparatus, a portable web browser or a vehicle-mounted mobile station.

In general, the embodiments of the present application may be implemented in hardware or special-purpose circuits, software, logic or any combination thereof. For example, some aspects may be implemented in hardware, while other aspects may be implemented in firmware or software executable by a controller, a microprocessor or other computing apparatuses, although the present application is not limited thereto.

The embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. An information communication method, the method being applied to a first communication node and comprising: receiving report configuration information from a second communication node, wherein the report configuration information comprises indication information of an uplink report; and sending the uplink report to the second communication node, wherein the uplink report comprises maximum power reduction (MPR) and alert identification information, the alert identification information being determined based on a first threshold and the MPR, and the alert identification information representing maximum power exposure (MPE) alert information, wherein sending the uplink report to the second communication node comprises: in association with the MPR being greater than or equal to a second threshold, wherein the uplink report comprises power headroom for an uplink shared channel, an uplink control channel, or an uplink reference signal.

2. The method according to claim 1, wherein sending the uplink report to the second communication node comprises: in association with a variation between a current MPR and an MPR for sending of the uplink report information last time being greater than or equal to a fourth threshold, sending the uplink report to the second communication node.

3. The method according to claim 1, wherein sending the uplink report to the second communication node comprises: in association with a timer associated with the MPR overflowing, sending the uplink report to the second communication node.

4. An information communication method, the method being applied to a second communication node and comprising: sending report configuration information to a first communication node, wherein the report configuration information comprises indication information of an uplink report; and receiving the uplink report from the first communication node, wherein the uplink report comprises maximum power reduction (MPR) and alert identification information, the alert identification information being determined based on a first threshold and the MPR, and the alert identification information representing maximum power exposure (MPE) alert information, wherein receiving the uplink report from the first communication node comprises: in association with the MPR being greater than or equal to a second threshold, wherein the uplink report comprises power headroom for an uplink shared channel, an uplink control channel, or an uplink reference signal.

5. The method according to claim 4, wherein receiving the uplink report from the first communication node comprises: in association with a variation between a current MPR and an MPR for sending of the uplink report last time being greater than or equal to a fourth threshold, receiving the uplink report from the first communication node.

6. The method according to claim 4, wherein receiving the uplink report from the first communication node comprises: in association with a timer associated with the MPR overflowing, receiving the uplink report from the first communication node.

7. A first communication node, comprising: one or more processors; and a storage apparatus, which is configured to store one or more programs; wherein the one or more processors are configured to executed the one or more programs to perform steps comprising: receiving report configuration information from a second communication node, wherein the report configuration information comprises indication information of an uplink report; and sending the uplink report to the second communication node, wherein the uplink report comprises maximum power reduction (MPR) and alert identification information, the alert identification information being determined based on a first threshold and the MPR, and the alert identification information representing maximum power exposure (MPE) alert information, wherein the one or more processors are configured to execute the one or more programs in association with the MPR being greater than or equal to a second threshold, wherein the uplink report comprises power headroom for an uplink shared channel, an uplink control channel, or an uplink reference signal.

8. The first communication node of claim 7, wherein the one or more processors are configured to execute the one or more programs to send the uplink report to the second communication node by:
in association with a variation between a current MPR and an MPR for sending of the uplink report last time being greater than or equal to a fourth threshold, sending the uplink report to the second communication node.

9. The first communication node of claim 7, wherein the one or more processors are configured to execute the one or more programs to send the uplink report to the second communication node by:
in association with a timer associated with the MPR overflowing, sending the uplink report to the second communication node.

10. A second communication node, comprising: one or more processors; and a storage apparatus, which is configured to store one or more programs; wherein the one or more processors are configured to executed the one or more programs to perform steps comprising: sending report configuration information to a first communication node, wherein the report configuration information comprises indication information of an uplink report; and receiving the uplink report from the first communication node, wherein the uplink report comprises maximum power reduction (MPR) and alert identification information, the alert identification information being determined based on a first threshold and the MPR, and the alert identification information representing maximum power exposure (MPE) alert information, wherein the one or more processors are configured to execute the one or more programs in association with the MPR being greater than or equal to a second threshold, wherein the uplink report comprises power headroom for an uplink shared channel, an uplink control channel, or an uplink reference signal.

11. The second communication node of claim 10, the one or more processors are configured to execute the one or more programs to receive the uplink report from the first communication node by:
in association with a variation between a current MPR and an MPR for sending of the uplink report last time being greater than or equal to a fourth threshold, receiving the uplink report from the first communication node.

12. The second communication node of claim 10, the one or more processors are configured to execute the one or more programs to receive the uplink report from the first communication node by:
in association with a timer associated with the MPR overflowing, receiving the uplink report from the first communication node.

13. A non-transitory computer-readable storage medium, storing one or more computer programs, the one or more computer programs, when executed by a processor, causing a communication node to carry out the method of claim 1.

14. A non-transitory computer-readable storage medium, storing one or more computer programs, the one or more computer programs, when executed by a processor, causing a communication node to carry out the method of claim 4.

* * * * *